United States Patent [19]
Eberling

[11] Patent Number: 5,378,054
[45] Date of Patent: Jan. 3, 1995

[54] SYSTEM TO CONSERVE STOP LAMP CIRCUIT POWER ON INTERMEDIATE VEHICLES OF VEHICLE TRAIN

[75] Inventor: Charles E. Eberling, Wellington, Ohio

[73] Assignee: AlliedSignal Inc., Morristown, N.J.

[21] Appl. No.: 57,599

[22] Filed: May 4, 1993

[51] Int. Cl.$^6$ .............................................. B60T 13/00
[52] U.S. Cl. ........................................ 303/7; 213/76
[58] Field of Search .......... 303/7, 8, 118.1, DIG. 1-4, 303/20, 3, 15; 188/112 A, 112 R; 213/1.3, 76; 307/9.1; 116/55, 58 R; 340/468, 479, 686, 687, 551

[56] References Cited

U.S. PATENT DOCUMENTS

| | | | |
|---|---|---|---|
| 3,812,444 | 5/1974 | Reno | 213/76 |
| 3,842,987 | 10/1974 | Prada | 213/76 |
| 4,049,128 | 9/1977 | Jeffrey | 213/76 |

*Primary Examiner*—Matthew C. Graham
*Attorney, Agent, or Firm*—Ken C. Decker

[57] ABSTRACT

A fluid pressure system and stoplight control circuit for a towed vehicle which is either an intermediate unit or the last unit of a vehicle train includes an inlet supply line for receiving fluid pressure from a preceding unit and an outlet supply line which is connected to a corresponding coupling of a succeeding unit when the vehicle is an intermediate unit and which is connected to a coupling hanger when the unit is the last unit of a vehicle train. A pressure responsive stop light switch is connected into the coupling hanger. Accordingly, when the outlet supply line is connected to the coupling hanger, the contacts of the stop light switch are closed, thus permitting power to the stop lights when a brake application is effected. However, when the outlet supply line is connected to a succeeding vehicle, the coupling hanger is vented, so that the contacts of the pressure responsive switch are open, thus interrupting power to the stop lights and conserving power on the vehicle.

8 Claims, 3 Drawing Sheets

SYSTEM TO CONSERVE STOP LAMP CIRCUIT POWER ON INTERMEDIATE VEHICLES OF VEHICLE TRAIN

BACKGROUND OF THE INVENTION

This invention relates to a fluid pressure braking system and stop light control circuit for a towed vehicle.

Heavy duty vehicles, normally consisting of a tractor and at least one trailer, are normally equipped with a fluid pressure braking system. More recently, it has also become common for such vehicle to be equipped with an adaptive braking system which responds to an incipient skidding condition of a vehicle wheel to control wheel lockup. It is also has become increasingly common for a single tractor to pull two or even three trailers in a so-called "turnpike train". The adaptive braking system on such vehicles is powered by the stop lamp circuit. Because each of the tractor, trailers and dollies (which must be used with second and third trailers) are equipped with their own set of stop lights, power consumption due to stop lamp draw can be as high 15 watts per vehicle. This can result in a significant voltage drop to the antilock systems used on these trailers and dollies, which can significantly reduce the voltage to the antilock modulators, and may cause them to malfunction. However, it is not necessary that the stop lamps on the intermediate trailers and dollies be operated, although these vehicles must be equipped with stop lights because they may on occasion be used as the last unit in the vehicle train. By not illuminating the stop lamp on intermediate units preceding the last unit of the vehicle train, power is conserved, and sufficient voltage to assure proper operation of the antiskid system at all times is assured.

SUMMARY OF THE INVENTION

The present invention proposes a system in which the stoplights of an intermediate vehicle are extinguished.

BRIEF DESCRIPTION OF THE DRAWINGS

These and other advantages of the present invention will become apparent from the following description, with reference to the accompanying drawings, in which.

DESCRIPTION OF THE PREFERRED EMBODIMENT

Figure 1:
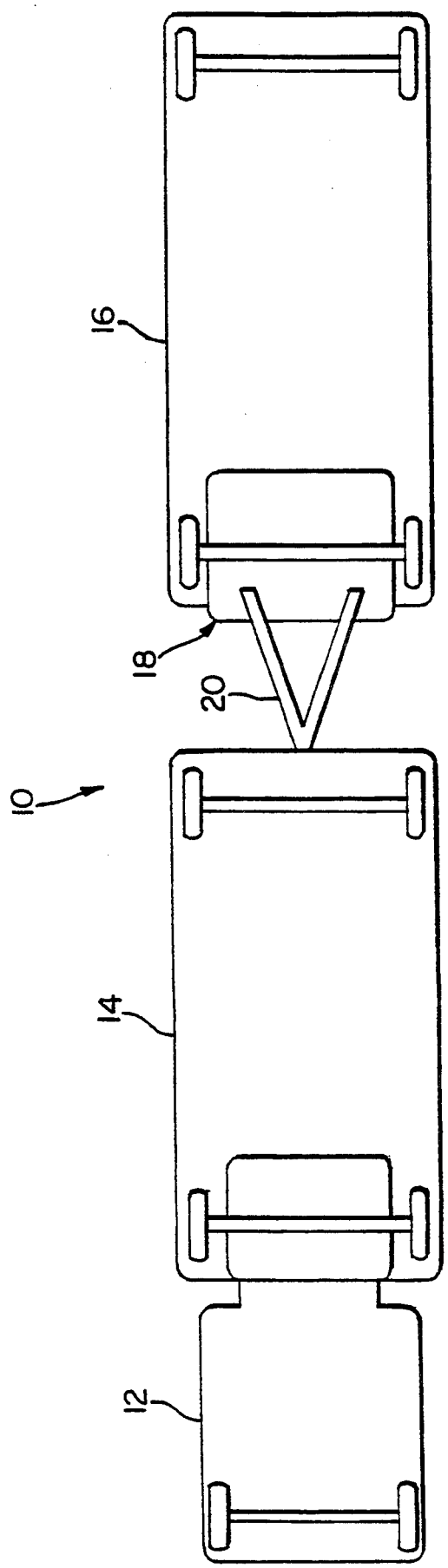
FIG. 1 is a schematic illustration of a heavy duty vehicle with multiple trailers.

The following description is with reference to the braking system and stop light control circuit of a trailer dolly used to support the forward end of the second or third trailer of a multiple unit vehicle. However, the invention is equally applicable to intermediate trailers as well as dollies. Referring now to FIG. 1, a multiple unit combination vehicle generally indicated by the numeral 10 includes a tractor 12 which pulls trailers 14 and 16. On some highways, even a third trailer may be pulled by a single tractor 12. The trailer 14 is coupled to the tractor 12 through a conventional fifth-wheel arrangement (not shown), and the trailer 16 is coupled to the trailer 14 by a dolly 18 which carries a fifth-wheel coupling (not shown) which mates with the conventional coupling carried by the trailer 16. The dolly 18 is connected to the trailer 14 through a tongue assembly 20, which connects to the rear bulkhead of the trailer 14. The tractor 12, the trailers 14 and 16, and the dolly 18 are all equipped with a conventional air brake system, and each of the units 12, 14, 16 and 18 is also preferably equipped with an antiskid system to prevent wheel lockup. The fluid pressure braking system is conventionally an air brake system in which compressed air is generated by a conventional air compressor (not shown) to charge reservoirs carried by each of the units. Pressure is communicated from the unit 12 to the units 14, 16 and 18 through conventional supply lines, and service brake actuation signals are communicated from a foot valve located in the operators compartment in the tractor 12 to the units 14, 16 and 18 for actuating the service brakes thereof through conventional service brake lines interconnecting the units.

Figure 2:
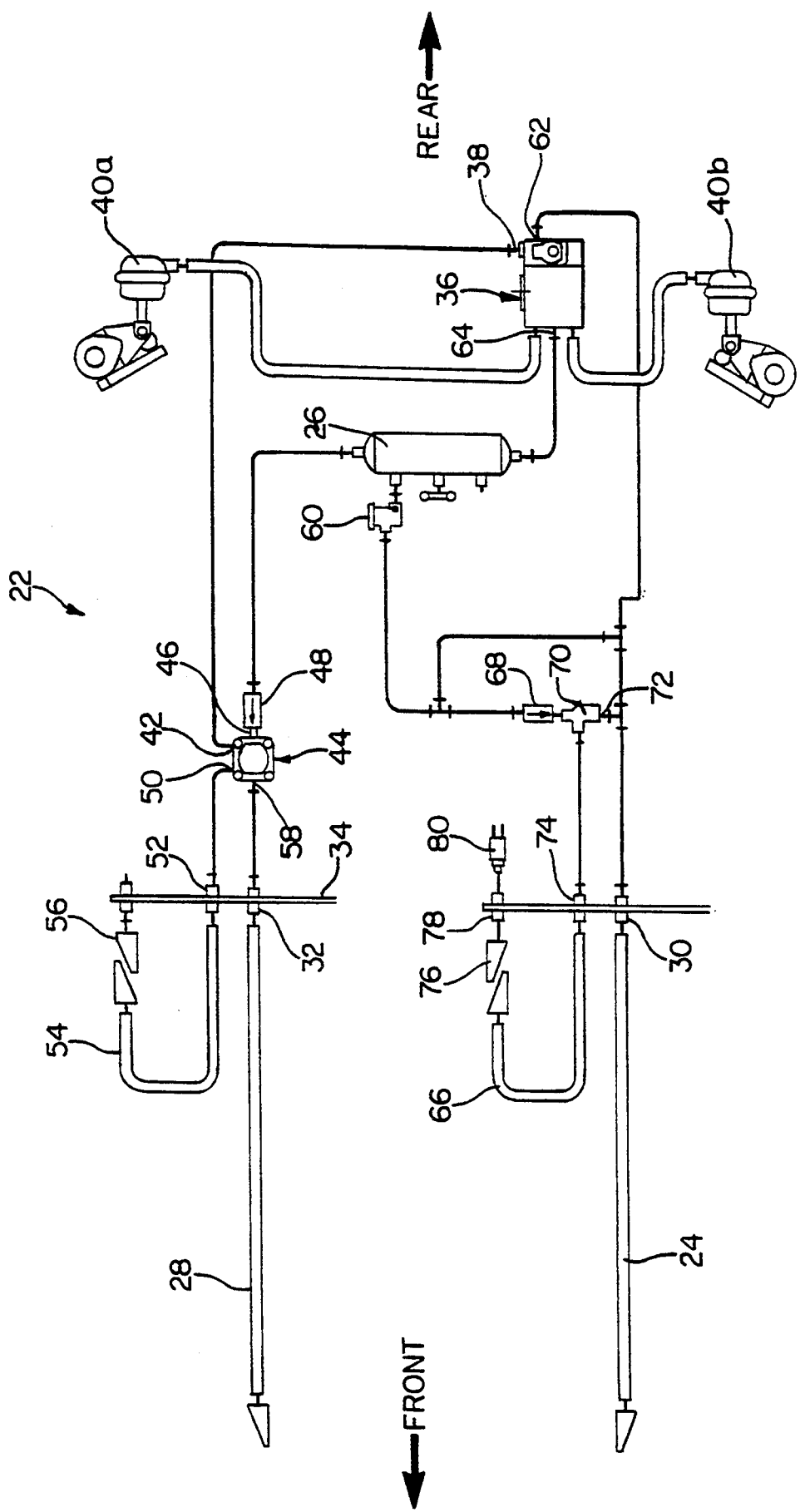
FIG. 2 is a schematic illustration of a braking system used on the trailer dolly illustrated schematically in FIG. 1.

Referring now to FIG. 2, the braking system for the dolly 18 is generally indicated by the numeral 22. The braking system 22 includes an inlet supply line 24, which is coupled to a receptacle at the rear of the trailer 14 when the dolly 20 is being pulled by the trailer 14 and which communicates compressed Air to a conventional reservoir 26 mounted on the dolly 18. A control line 28 is coupled to a similar receptacle at the rear of the trailer 14 and communicates service brake actuation signals generated by the vehicle operator in operating the conventional foot valve in the operator's compartment to the dolly 18. Each of the lines 24 and 28 are connected to the dolly 18 through appropriate fittings 30, 32 in the front bulkhead 34 of the dolly 18.

Modulating relay valve 36 is a part of the antiskid braking system and incorporates an electronic control unit (not shown) which controls the relay valve section of the valve 36 during control of the vehicle brakes by the antilock system. When the brakes are not being controlled by the antilock system, modulating relay valve 36 acts as a conventional relay valve and responds to pressure at control port 38 thereof to deliver pressure to brake actuators 40a, 40b through the reservoir 26. The control port 38 is communicated to one of the delivery ports 42 of a pilot relay valve 44, which may be made pursuant to the teachings of U.S. patent application Ser. No. 7/874,904 filed Apr. 28, 1992. The pilot relay valve 44 includes a supply port 46 which is connected to pressure in the reservoir 26 through a one way check valve 48. The pilot relay valve 44 further includes another delivery port 50 which is connected through fitting 52 in bulkhead 34 to an outlet service or control line 54. Outlet service or control line 54 is connected to the corresponding control line of the trailer 16 when the dolly 18 is coupled to the trailer 16. When the dolly 18 is "deadheaded", that is, pulled by a tractor or trailer without being coupled to a second or third trailer, the control line is coupled to coupling hanger 56. The control port 58 of the pilot relay valve 44 receives pressure signals direct form the controller service line 28.

The supply line 24 charges reservoir 26 through a conventional pressure protection valve 60. Supply line 24 is also connected to emergency port 62 of the modulating relay valve 36 to provide normal emergency brake function. Reservoir 26 supplies pressure to the modulating relay valve 36 for delivery to the brake actuators 40a, 40b through supply port 64. The reservoir 26 is communicated to an outlet supply line 66 through a one way check valve 68 and a conventional synchronizing valve 70. The control port 72 of synchronizing valve 70 is connected directly to supply line 24, so that the synchronizing valve 70 closes off the outlet supply line 66 when pressure in supply line 24 drops below a predetermined level. Outlet supply line 66 is communicated with synchronizing valve 70 through a fitting 74 on bulkhead 34, and is also connected to a corresponding supply line of the trailer 16 when the dolly 18 is used to pull a trailer. When the dolly is deadheaded, the supply line 16 is coupled with a coupling hanger 76 which is mounted on fitting 78 carried by bulkhead 34. A conventional, pressure responsive stop light switch 80 is also connected to the coupling hanger 76. The contacts of the stop light switch 80 are closed in response to pressure at coupling hanger 76 supplied through supply line 66 when coupled thereto during deadheading of the dolly 18. When the outlet supply line 66 is coupled to the supply line of a trailer 16, the coupling hanger 76 will be vented; accordingly, the contacts of the pressure responsive switch 80 will be opened.

Figure 3:
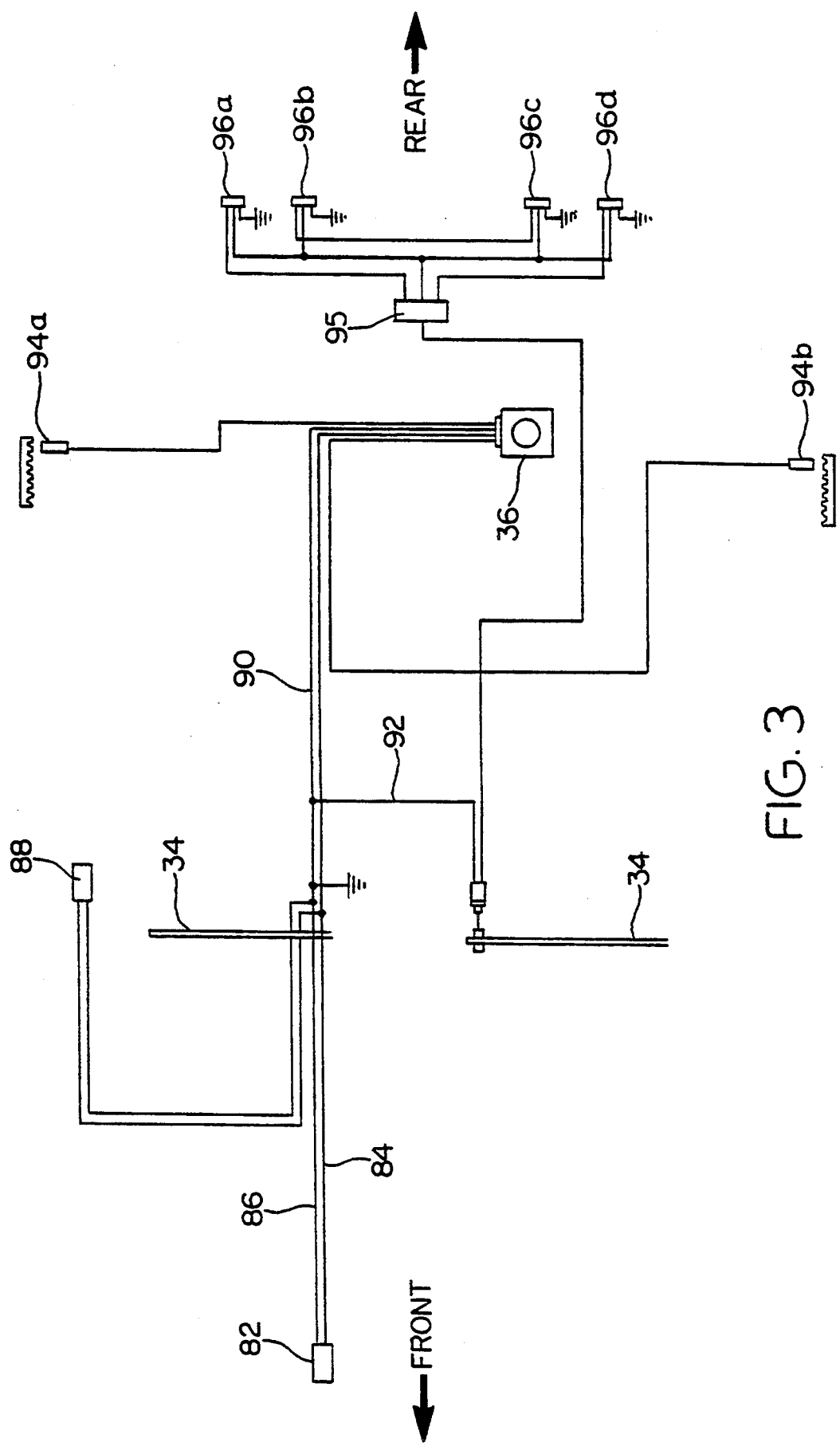
FIG. 3 is all electrical schematic of the stop light and braking circuit used on the dolly illustrated in FIG. 1.

Referring now to FIG. 3, a conventional inlet plug assembly generally indicated by the numeral 82 carries a ground conductor 84 and a stop light circuit conductor 86. The connector 82 also couples with conductors providing power to the clearance lights, right and left turn signals, tail and license lights, and any auxiliary lights, but these conductors form no pare of the present invention and have been omitted for clarity. The connector 82 is received in an appropriate receptacle provided in the rear bulkhead of the preceding trailer 14. An outlet connector 88 includes conductors which tap off the conductors, including the conductors 84 and 86, and which are used for transmitting power and ground to a succeeding trailer such as the trailer 16 when the dolly is used to tow a trailer. The ground wire 84 is connected to the vehicle body of the dolly 18 to ground the body. The conductor 86 is split into two branches 90, 92. Branch 90 is connected directly to the modulating relay valve 36 to supply power to the antilock system. The modulating relay valve 36 also receives signals from conventional speed sensors 94a, 94b which measure the wheel speed of wheels on opposite sides of the dolly. Branch 92 is connected through the stoplight switch 80 to a junction box 95 which distributes power to stop lights 96a, 96b, 96c, and 96d. Of course, the stop lights 96a–d may also serve as taillights and directional signals, but these are powered separately.

In operation, reservoir 26 is charged through supply line 24. The pilot relay valve response to pressure signals received through control line 28 to open the pilot relay valve 44 thereby communicating reservoir pressure to the outlet control line 54 and to the control port 30 of modulating relay valve 36, thereby effecting a service brake actuation of the brakes 40a, 40b in the normal manner by communicating pressure from the reservoir 26 to the brake actuators. If the dollar 18 is being used to pull a trailer, both the outlet control line 54 and the outlet supply line 66, which will be pressurized as long as pressure exists in supply line 24, will be coupled to the corresponding connections with the succeeding trailer 16. However, when the dolly is deadheaded, the outlet control line 54 is coupled to coupling hanger 56 and the outlet supply line 66 is connected to coupling hanger 76. It will also be noted that, so long as the outlet supply line 66 remains connected to a corresponding coupling of the succeeding trailer 16, coupling hanger 76 will be vented, so that the contacts of pressure switch 80 will be opened. Accordingly, the branch 92 of stop light circuit 86 will be switched off, preventing the stop lights 96a–d from operating. When the dolly is being deadheaded, it is therefore the last unit in the vehicle train, and the outlet supply line 66 will be coupled to the coupling hanger 76. During normal operation of the vehicle the reservoir 26 will nevertheless be charged with pressure which will be communicated to outlet supply line 66 through the valve 68 and 70 regardless of whether the dolly is being used to pull a trailer or not. Accordingly, the coupling hanger 76 will be pressurized, and the contacts of the pressure switch 80 will close, thereby closing the circuit through branch 92 to the stop lights 96a–d, thus permitting normal operate, on of the latter. Accordingly, with the system disclosed in FIGS. 2 and 3, the stop lights 96a–d will not operate when the dolly is being used to pull a trailer, but will automatically operate when the outlet supply line 66 is connected to the coupling hanger 76 when the dolly is not being used to pull a trailer.

I claim:

1. Fluid pressure braking system and stoplight control circuit in a towed vehicle equipped with stoplights and having fluid pressure operated brakes, said towed vehicle being either an intermediate unit or the last unit of a vehicle train, said braking system including an inlet supply connection for receiving fluid pressure from a preceding unit in the train and an outlet supply connection for transmitting fluid pressure to a succeeding unit in the vehicle train if the towed vehicle is an intermediate unit in the vehicle train, said stoplight control circuit being activated only when a brake application is effected and including means for receiving power from said preceding unit when a brake application is effected for operating said stoplight control circuit and a pressure responsive switch connected to said outlet supply connection when the vehicle is the last unit in the vehicle switch, said pressure responsive switch being switchable from an enabling condition to a disabling condition disabling a portion of said stoplight control circuit operating the vehicle stoplights when said vehicle is an intermediate unit and enabling said stoplight control circuit when the vehicle is the last unit in the vehicle train.

2. Braking system and stoplight control circuit as claimed in claim 1, wherein said braking system includes an antiskid modulator for controlling braking pressure communicated to said brakes during an incipient skidding condition, said stoplight control circuit including another portion connected to said modulator for supplying power to the latter regardless of the condition of the pressure responsive switch.

3. Braking system and stoplight control circuit as claimed in claim 2, wherein said vehicle includes a coupling hanger, said outlet supply connection including an outlet flexible supply line connected to the supply line of a succeeding vehicle when the towed vehicle is an intermediate unit and to said coupling hanger when the towed vehicle is the last unit whereby fluid pressure is communicated into said coupling hanger when the outlet supply line is connected to the coupling hanger.

4. Braking system and stoplight control circuit as claimed in claim 3, wherein said pressure responsive switch responds to the pressure level in the coupling hanger.

5. Braking system and stoplight control circuit as claimed in claim 4, wherein said pressure responsive switch responds to pressure to switch to said enabling condition and to the absence of pressure to switch to said disabling condition.

6. Braking system and stoplight control circuit as claimed in claim 2, wherein said pressure responsive switch responds to pressure to switch to said enabling condition and to the absence of pressure to switch to said disabling condition.

7. Braking system and stoplight control circuit as claimed in claim 1, wherein said vehicle includes a coupling hanger, said outlet supply connection including an outlet flexible supply line connected to the supply line of a succeeding vehicle when the towed vehicle is an intermediate unit and to said coupling hanger when the towed vehicle is the last unit whereby fluid pressure is communicated into said coupling hanger when the outlet supply line is connected to the coupling hanger.

8. Braking system and stoplight control circuit as claimed in claim 7, wherein said pressure responsive switch responds to the pressure level in the coupling hanger.

* * * * *